United States Patent
Shanmuga Vadivel et al.

(10) Patent No.: US 12,293,563 B2
(45) Date of Patent: May 6, 2025

(54) AUTOMATED DATA ANNOTATION FOR COMPUTER VISION APPLICATIONS

(71) Applicant: Synaptics Incorporated, San Jose, CA (US)

(72) Inventors: Karthikeyan Shanmuga Vadivel, San Jose, CA (US); Omar Oreifej, Costa Mesa, CA (US); Patrick A. Worfolk, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 385 days.

(21) Appl. No.: 17/829,844

(22) Filed: Jun. 1, 2022

(65) Prior Publication Data

US 2023/0394786 A1    Dec. 7, 2023

(51) Int. Cl.
| | | |
|---|---|---|
| *G06K 9/00* | (2022.01) | |
| *G06N 3/08* | (2023.01) | |
| *G06V 10/48* | (2022.01) | |
| *G06V 20/70* | (2022.01) | |

(52) U.S. Cl.
CPC ............. *G06V 10/48* (2022.01); *G06N 3/08* (2013.01); *G06V 20/70* (2022.01)

(58) Field of Classification Search
CPC ........... G06N 3/08; G06V 10/82; G06V 10/48
See application file for complete search history.

(56) References Cited

U.S. PATENT DOCUMENTS

| | | | | |
|---|---|---|---|---|
| 10,417,781 | B1* | 9/2019 | Konolige | G06F 16/5854 |
| 10,430,946 | B1* | 10/2019 | Zhou | A61B 5/02007 |
| 10,935,773 | B2* | 3/2021 | Johnson | G06V 10/764 |
| 2010/0111365 | A1* | 5/2010 | Dixon | G01S 11/12 |
| | | | | 382/105 |
| 2013/0215264 | A1* | 8/2013 | Soatto | G06V 20/20 |
| | | | | 348/143 |
| 2019/0102646 | A1* | 4/2019 | Redmon | G06V 20/20 |

(Continued)

OTHER PUBLICATIONS

Liu, Chen, et al. "Planercnn: 3d plane detection and reconstruction from a single image." Proceedings of the IEEE/CVF Conference on Computer Vision and Pattern Recognition. 2019. (Year: 2019).*

(Continued)

*Primary Examiner* — Hadi Akhavannik
(74) *Attorney, Agent, or Firm* — Paradice & Li LLP (57) ABSTRACT

This disclosure provides methods, devices, and systems for training machine learning models. The present implementations more specifically relate to techniques for automating the annotation of data for training machine learning models. In some aspects, a machine learning system may receive a reference image depicting an object of interest with one or more annotations and also may receive one or more input images depicting the object of interest at various distances, angles, or locations but without annotations. The machine learning system maps a set of points in the reference image to a respective set of points in each input image so that the annotations from the reference image are projected onto the object of interest in each input image. The machine learning system may further train a machine learning model to produce inferences about the object of interest based on the annotated input images.

20 Claims, 10 Drawing Sheets

(56) References Cited

U.S. PATENT DOCUMENTS

2019/0384047 A1* 12/2019 Johnson ................. G06N 3/045

OTHER PUBLICATIONS

European Search Report from from European patent application No. 23176147, dated Oct. 20, 2023, pp. 1-10.

P. Duan, J. Pan and W. Rao, "MaskS R-CNN Text Detector," 2020 IEEE International Conference on Artificial Intelligence and Information Systems (ICAIIS), Dalian, China, 2020, pp. 5-8, doi: 10.1109/ICAIIS49377.2020.9194911.

P. Ramirez, et al., "Shooting Labels: 3D Semantic Labeling by Virtual Reality," in 2020 IEEE International Conference on Artificial Intelligence and Virtual Reality (AIVR), Utrecht, Netherlands, 2020 pp. 99-106. doi: 10.1109/AIVR50618.2020.00027.

Office Action from European patent application No. 23176147.9, dated Jul. 4, 2024, pp. 1-8.

Xu et al., "Efficient Large-Scale Geometric Verification for Structure from Motion," Pattern Recognition Letters, 125 (2019), pp. 166-173.

* cited by examiner

AUTOMATED DATA ANNOTATION FOR COMPUTER VISION APPLICATIONS

TECHNICAL FIELD

The present implementations relate generally to machine learning, and specifically to automated data annotation for machine learning.

BACKGROUND OF RELATED ART

Computer vision is a field of artificial intelligence (AI) that uses machine learning to draw inferences about an environment from images of the environment. Machine learning is a technique for improving the ability of a computer system or application to perform a certain task. Machine learning generally includes a training phase and an inferencing phase. During the training phase, a machine learning system (such as a neural network) is provided with one or more "answers" and a large volume of raw training data associated with the answers. The machine learning system analyzes the training data to learn a set of rules (also referred to as a "model") that can be used to describe each of the one or more answers. During the inferencing phase, a computer vision application may infer answers from new data using the learned set of rules. Example computer vision applications include object detection and object tracking, among other examples.

Data annotation is the process of tagging or labeling training data to provide context for the training operation. For example, when training a machine learning model to identify a particular object (or class of objects) in images, the machine learning system may be provided a large volume of input images depicting the object. Each of the input images may be annotated to ensure that the machine learning system can learn a set of features that uniquely describes the target object to the exclusion of any other objects that may be depicted in the input images. Example suitable annotations may include, among other examples, a bounding box surrounding the target object in each of the input images and contextual information labeling the target object within each bounding box.

Existing data annotation techniques rely on human operators to review and annotate each input image (or other training data) to be used for training. Due to the large volume of input images required for training, human operators may require hundreds of hours (if not longer) to construct an annotated set of input images. Thus, there is a need to more efficiently annotate training data.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of training a machine learning model. The method includes steps of receiving a first input image depicting an object of interest; receiving a reference image depicting the object of interest and one or more annotations associated with the object of interest; mapping a plurality of first points in the reference image to a respective plurality of second points in the first input image so that the one or more annotations in the reference image are projected onto the object of interest in the first input image; and training the machine learning model to produce inferences from images depicting the object of interest based at least in part on the mapping of the plurality of first points to the plurality of second points.

Another innovative aspect of the subject matter of this disclosure can be implemented in a machine learning system including a processing system and a memory. The memory stores instructions that, when executed by the processing system, causes the machine learning system to receive a first input image depicting an object of interest; receive a reference image depicting the object of interest and one or more annotations associated with the object of interest; map a plurality of first points in the reference image to a respective plurality of second points in the first input image so that the one or more annotations in the reference image are projected onto the object of interest in the first input image; and train the machine learning model to produce inferences from images depicting the object of interest based at least in part on the mapping of the plurality of first points to the plurality of second points.

BRIEF DESCRIPTION OF THE DRAWINGS

The present embodiments are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Various aspects relate generally to machine learning, and more specifically, to techniques for automating the annotation of data for training machine learning models. In some aspects, a machine learning system may receive a reference image depicting an object of interest with one or more annotations and also may receive one or more input images depicting the object of interest at various distances, angles, or locations but without annotations. The machine learning system maps a set of points in the reference image to a respective set of points in each input image so that the annotations from the reference image are projected onto the object of interest in each input image. In some implementations, the mapping may be based on a homography. For example, the machine learning system may calculate a respective homography for each input image that transforms the points in the reference image to the respective points in the input image. Each homography may be applied to the annotations in the reference image to annotate a respective input image. The machine learning system may further train a machine learning model to produce inferences about the object of interest based on the annotated input images.

Particular implementations of the subject matter described in this disclosure can be implemented to realize one or more of the following potential advantages. By mapping various points in a reference image to respective points in an input image, aspects of the present disclosure may substantially automate the process of data annotation. For example, a human operator can annotate a single reference image and utilize the machine learning system to programmatically transfer the annotations from the reference image to a large volume of input images. In contrast with existing data annotation techniques, which require a human operator to manually annotate each input image, the data annotation techniques of the present disclosure can substantially reduce the time and cost associated with training machine learning models or may allow more input data to be annotated and processed for training during the same interval of time.

Figure 1:
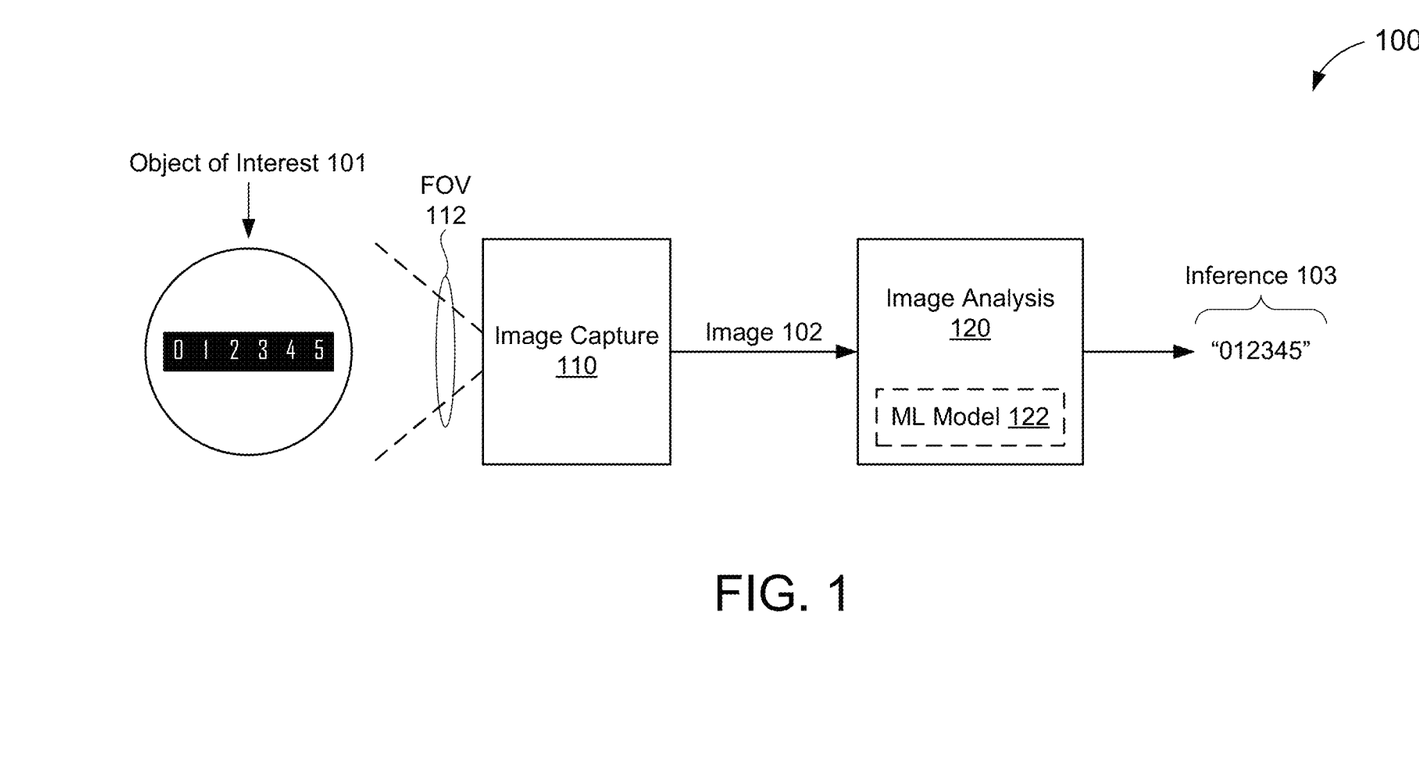
FIG. 1 shows a block diagram of an example computer vision system, according to some implementations.

FIG. 1 shows a block diagram of an example computer vision system 100, according to some implementations. In some aspects, the computer vision system 100 may be configured to generate inferences about one or more objects of interest (also referred to as "target objects"). In the example of FIG. 1, an object of interest 101 may be any device capable of displaying a dynamic sequence of digits or numbers on a substantially flat or planar surface. Example suitable objects of interest include water meters, electrical meters, or various other digital or analog metering devices, among other examples. In some other implementations, the computer vision system 100 may be configured to generate inferences about various other objects of interest in addition to, or in lieu of, the object of interest 101.

The system 100 includes an image capture component 110 and an image analysis component 120. The image capture component 110 may be any sensor or device (such as a camera) configured to capture a pattern of light in its field-of-view (FOV) 112 and convert the pattern of light to a digital image 102. For example, the digital image 102 may include an array of pixels (or pixel values) representing the pattern of light in the FOV 112 of the image capture component 110. As shown in FIG. 1, the object of interest 101 is located within the FOV 112 of the image capture component 110. As a result, the digital images 102 may include the object of interest 101.

The image analysis component 120 is configured to produce one or more inferences 103 based on the digital image 102. In some aspects, the image analysis component 120 may generate inferences about the object of interest 101 depicted in the image 102. For example, the image analysis component 120 may detect the object of interest 101 in the digital image 102 and infer the numbers displayed thereon. In other words, the image analysis component 120 may output a numerical value (such as "012345"), as an inference 103, representing an interpretation or reading of the digits displayed by the object of interest 101.

In some implementations, the image analysis component 120 may generate the inference 103 based on a machine learning (ML) model 122. Machine learning is a technique for improving the ability of a computer system or application to perform a certain task. During a training phase, a machine learning system may be provided with multiple "answers" and one or more sets of raw data to be mapped to each answer. For example, a machine learning system may be trained to read the digits displayed by the object of interest 101 by providing the machine learning system with a large number of images depicting the object of interest 101 (which represents the raw data) and contextual information indicating the actual values of the digits displayed by the object of interest 101 in each image (which represents the answers).

The machine learning system analyzes the raw data to "learn" a set of rules that can be used to read or interpret the digits displayed by the same (or similar) object of interest 101 in other images. For example, the machine learning system may perform statistical analysis on the raw data to determine a common set of features (also referred to as "rules") that can be associated with each number or digit that can be displayed by the object of interest 101. Deep learning is a particular form of machine learning in which the model being trained is a multi-layer neural network. Deep learning architectures are often referred to as artificial neural networks due to the way in which information is processed (similar to a biological nervous system).

For example, each layer of the deep learning architecture is formed by a number of artificial neurons. The neurons are interconnected across the various layers so that input data (or the raw data) may be passed from one layer to another. More specifically, each layer of neurons may perform a different type of transformation on the input data that will ultimately result in a desired output (such as a numerical prediction). The interconnected framework of neurons may be referred to as a neural network model. In some implementations, the ML model 122 may be a neural network model. As such, the ML model 122 may include a set of rules that can be used to infer the values of each digit displayed by the object of interest 101.

In some aspects, data annotations may help guide the machine learning system to train a robust and accurate ML model 122. Data annotation is the process of tagging or labeling training data to provide context for the training operation. For example, each of the input images may be annotated to ensure that the machine learning system can learn a set of features that uniquely describes the object of interest 101 to the exclusion of any other objects or features that may be included in the input images. Example suitable annotations may include bounding boxes surrounding the digits displayed by the object of interest 101 and contextual information labeling or otherwise identifying the digit(s) bound by each bounding box.

Existing data annotation techniques rely on human operators to review and annotate each input image in a training set provided to a machine learning system. However, as described above, the machine learning system may require a large volume of input images to train a robust and accurate ML model. Moreover, each input image in a training set may depict the object of interest 101 at a different distance, angle, location, or under different lighting conditions. As a result, human operators may require hundreds of hours (if not longer) to annotate each input image in a given training set.

In some aspects, a machine learning system (or image annotation system) may annotate a large volume of input images with little or no involvement by a human operator. More specifically, the machine learning system may copy or transfer a set of annotations from an annotated reference image to each input image in a training set. In some implementations, the machine learning system may transfer the annotations from the reference image to each input image based on a mapping (such as a homography) between various points on the reference image to respective points on each input image. As a result, a human operator can manually annotate a single reference image and utilize the machine learning system to annotate the remaining input images in a training set.

Figure 2:
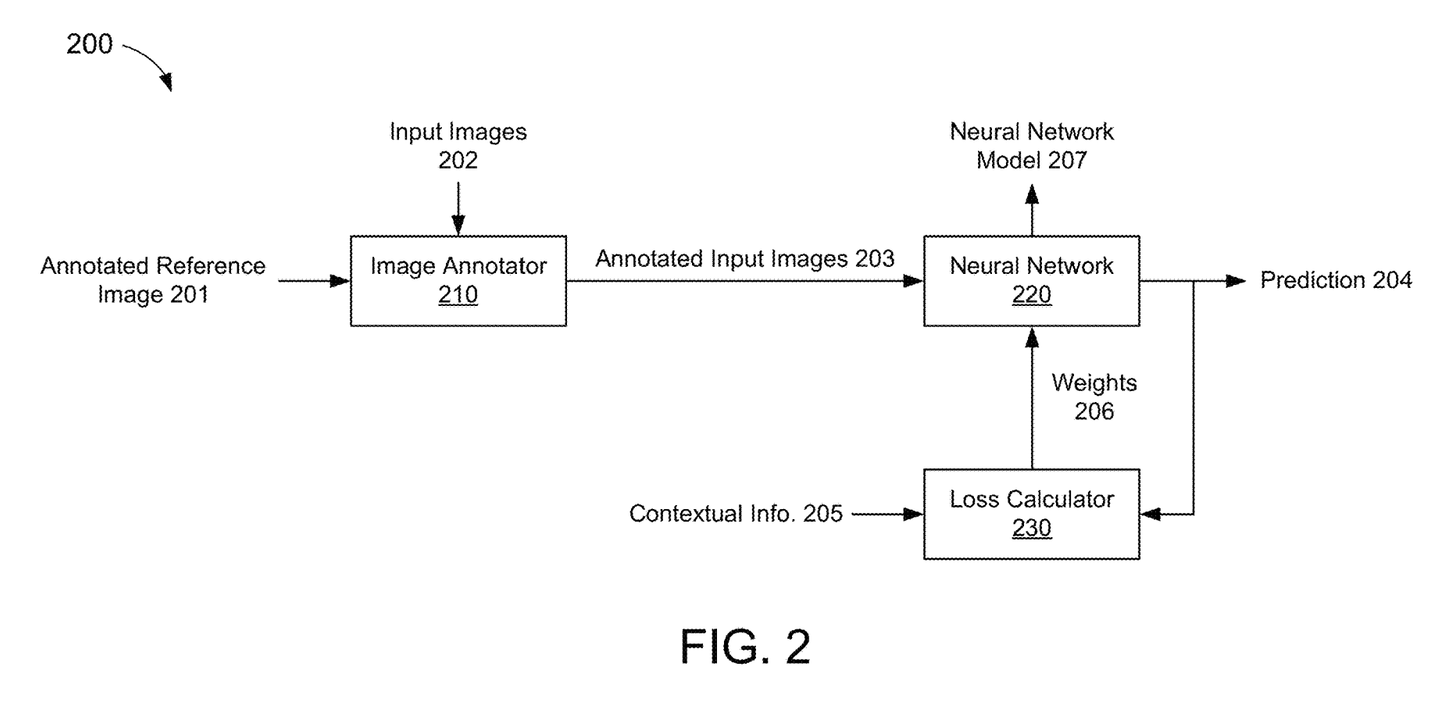
FIG. 2 shows a block diagram of a machine learning system, according to some implementations.

FIG. 2 shows a block diagram of a machine learning system 200, according to some implementations. In some aspects, the machine learning system 200 may be configured to produce a neural network model 207 based, at least in part, on one or more annotated reference images 201 and a set of input images 202. An annotated reference image 201 depicts an object of interest with one or more annotations. The input images 202 may depict the object of interest at various distances, angles, locations, or under various lighting conditions, but without the annotations included in the annotated reference image 201. In some aspects, the object of interest may be configured to display a sequence of digits (such as the object of interest 101 of FIG. 1). In some implementations, the neural network model 207 may be one example of the ML model 122 of FIG. 1. Thus, the neural network model 207 may include a set of rules that can be used to infer a value of each digit displayed by the object of interest.

The machine learning system 200 includes an image annotator 210, a neural network 220, and a loss calculator 230. In some aspects, the image annotator 210 may annotate each input image 202, as a respective annotated input image 203, based on the annotated reference image 201. Aspects of the present disclosure recognize that, because the same (or similar) object of interest is depicted in each of the reference image 201 and the input images 202, at least a portion of the reference image 201 and a respective portion of an input image 202 may depict the same set of features on the object of interest. Thus, the image annotator 210 may map a set of points on the reference image 201 to a respective set of points on an input image 202, where the mapped points coincide with the same feature(s) on the object of interest. In some implementations, the image annotator 210 may copy or transfer the annotations from the reference image 201 to a respective annotated input image 203 as a result of the mapping.

Figure 3A:
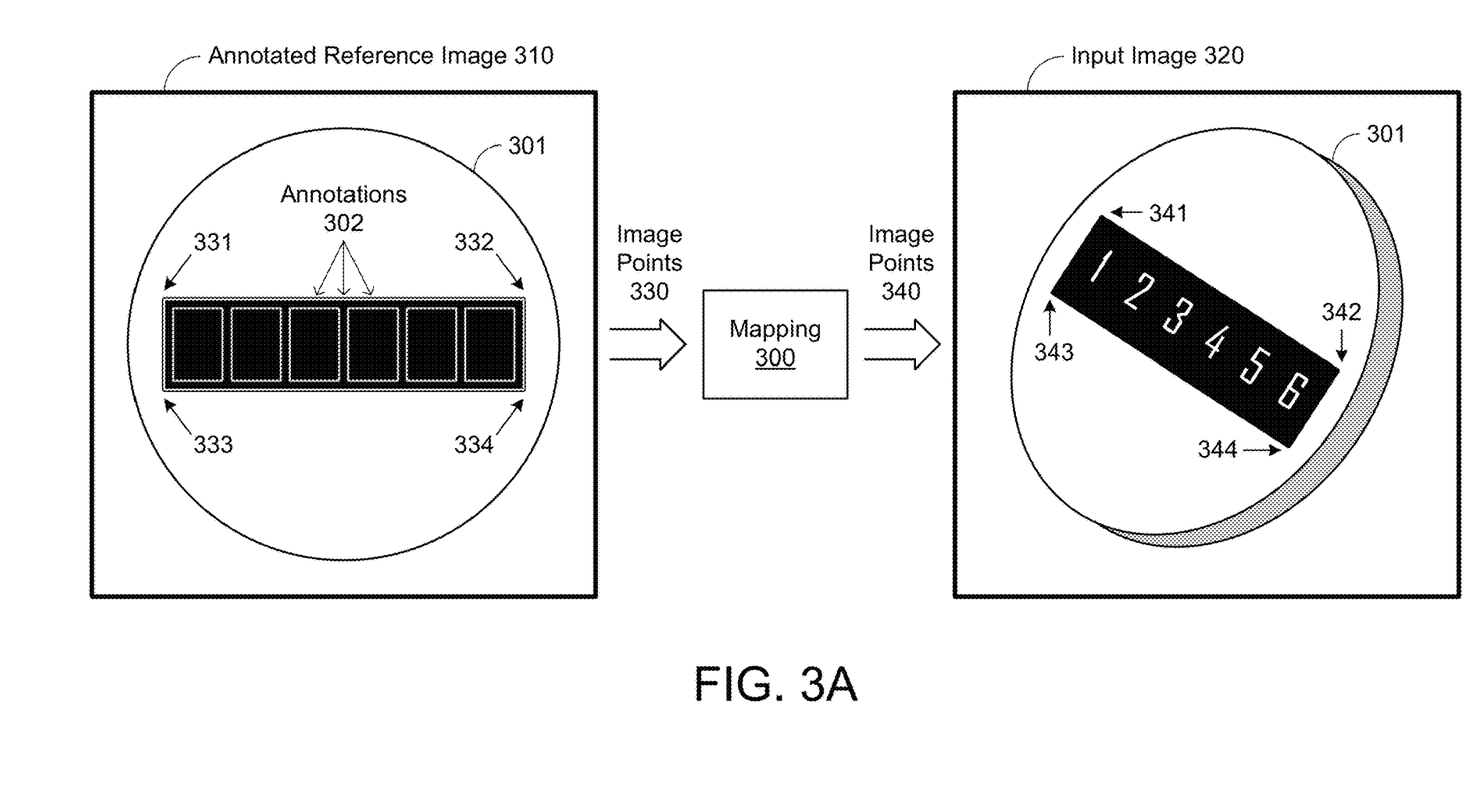
FIG. 3A shows an example mapping that relates a set of points on an annotated reference image to a respective set of points on an input image.

FIG. 3A shows an example mapping 300 that relates a set of points on an annotated reference image 310 to a respective set of points on an input image 320. In some implementations, the mapping 300 may be performed by the image annotator 210 of FIG. 2. Thus, the annotated reference image 310 may be one example of the annotated reference image 201 and the input image 320 may be one example of any of the input images 202.

As shown in FIG. 3A, the annotated reference image 310 depicts an object of interest 301 with a number of annotations 302. In some aspects, the object of interest 301 may be any device configured to display a sequence of digital or analog digits (such as a meter). The digits can be displayed within a display region (depicted as a black rectangle) at the center of the object of interest 301. In the example of FIG. 3A, the annotations 302 are shown to include a number of bounding boxes (depicted as six rectangular boxes each coinciding with a respective digit that can be displayed within the display region) and an image mask (depicted as a rectangular box that circumscribes the display region). By contrast, the input image 320 depicts the object of interest 301 with a sequence of digits ("123456") displayed in the display region, but without annotations. Further, the object of interest 301 is depicted at a different angle in the input image 320 than in the annotated reference image 310.

In some implementations, the mapping 300 may correlate various points 330 on the annotated reference image 310 (which includes image points 331-334) with respective points 340 on the input image 320 (which includes image points 341-344). In some implementations, the image points 330 and 340 may be associated with various features of the object of interest 301 (also referred to as "feature points"). For example, the top-left corner of the display region may be mapped to points 331 and 341 on the images 310 and 320, respectively; the top-right corner of the display region may be mapped to points 332 and 342 on the images 310 and 320, respectively; the bottom-left corner of the display region may be mapped to points 333 and 343 on the images 310 and 320, respectively; and the bottom-right corner of the display region may be mapped to points 334 and 344 on the images 310 and 320, respectively. As such, the mapping 300 may transform any image point in the first set 330 to a respective image point in the second set 340.

Figure 3B:
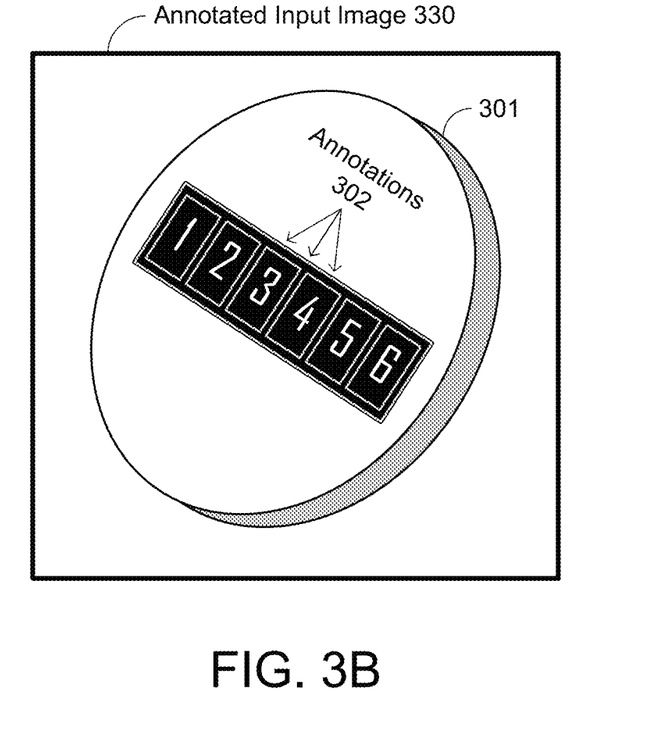
FIG. 3B shows an example of an annotated input image that can be produced as a result of the mapping depicted in FIG. 3A.

In some aspects, the mapping 300 may project the annotations 302 from the annotated reference image 310 onto the input image 320. For example, the annotations 302 may coincide with (or overlap) a subset of the image points 330 in the annotated reference image 310. As such, the mapping 300 may transform the image points 330 associated with the annotations 302 into respective image points 340 in the input image 320. In some aspects, the image annotator 210 may use the mapping 300 to annotate the input image 320. For example, the image annotator 210 may reproduce the annotations 302 on the subset of image points 340 (in the input image 320) associated therewith. FIG. 3B shows an example of an annotated input image 330 that can be produced as a result of the mapping 300 depicted in FIG. 3A. As shown in FIG. 3B, the annotated input image 330 depicts the object of interest 301 with the annotations 302. In some implementations, the annotated input image 330 may be one example of any of the annotated input images 203 of FIG. 2.

Referring back to FIG. 2, the neural network 220 receives each of the annotated input images 203 and attempts to read the numbers displayed thereon. For example, the object of interest may display a different sequence of numbers in each of the input images 202 (and thus, in each of the annotated input images 203). The actual numbers displayed in each of the input images 202 may be provided as contextual information 205 to the machine learning system 200. In some implementations, the neural network 220 may analyze the contents of the bounding boxes in each of the annotated input image 203 to predict the numbers displayed therein. For example, the neural network 220 may form a network of connections across multiple layers of artificial neurons that begin with an annotated input image 203 and lead to a prediction 204. The connections are weighted to result in a prediction 204 that reflects the numbers displayed by the object of interest in the annotated input image 203.

The loss calculator 230 compares the prediction 204 with the contextual information 205 to determine an amount of loss (or error) between the predicted values of the digits displayed by the object of interest and their actual values. The loss calculator 230 may further update a set of weights 206 associated with the connections in the neural network 220 based on the amount of loss. In some implementations, the training operation may be performed over multiple iterations. During each iteration, the neural network 220 produces a respective prediction 204 based on the weighted connections across the layers of artificial neurons, and the loss calculator 230 updates the weights 206 associated with the connections based on the amount of loss between the prediction 204 and the contextual information 205. The neural network 220 may output the weighted connections, as the neural network model 207, when certain convergence criteria are met (such as when the loss falls below a threshold level or after a predetermined number of iterations of the training operation have been completed).

Figure 4:
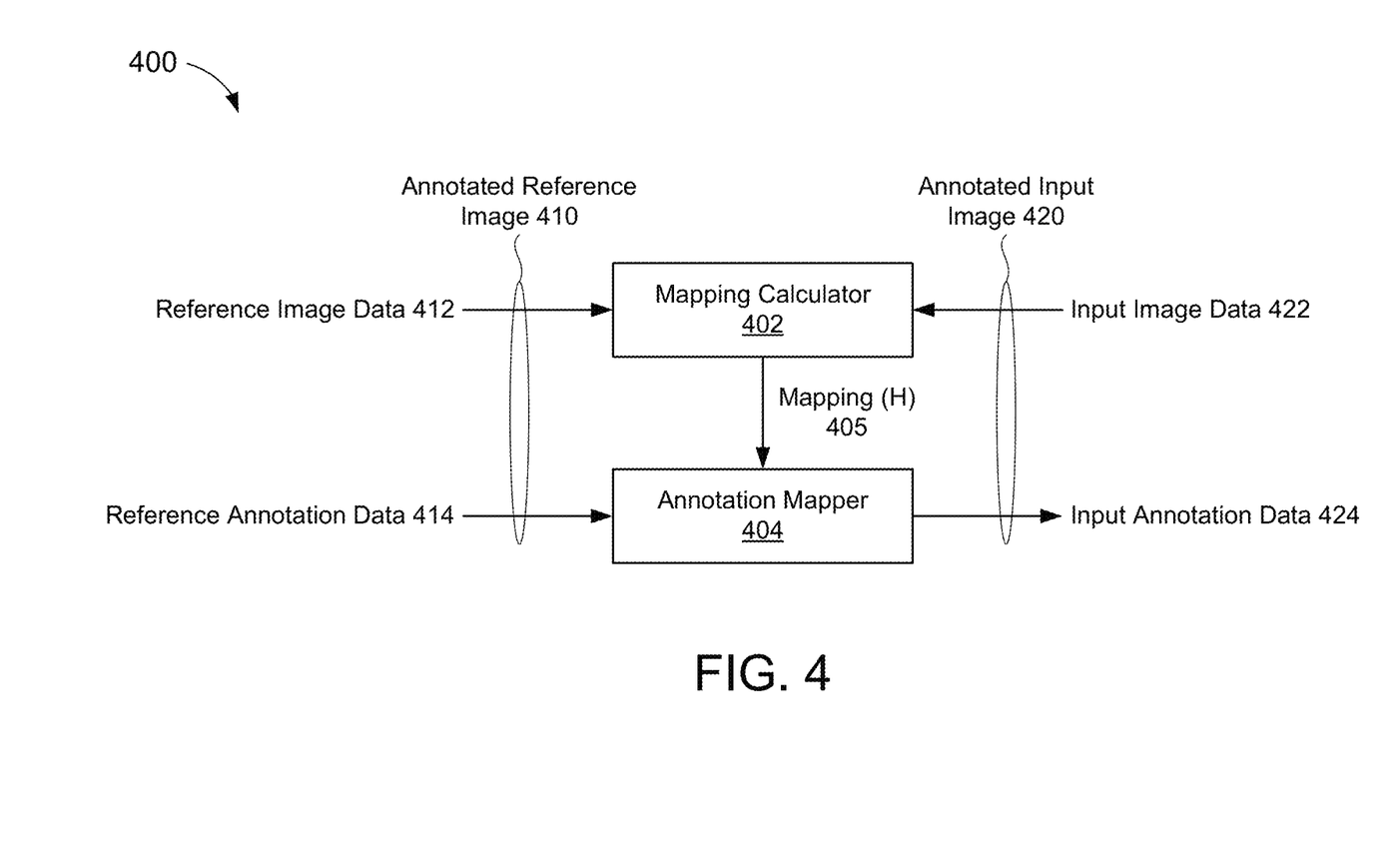
FIG. 4 shows a block diagram of an image annotation system, according to some implementations.

FIG. 4 shows a block diagram of an image annotation system 400, according to some implementations. In some implementations, the image annotation system 400 may be one example of the image annotator 210 of FIG. 2. Thus, the image annotation system 400 may be configured to annotate a set of input images (represented by input image data 422) based on an annotated reference image 410. In some implementations, the annotated reference image 410 may be one example of the annotated reference image 201 of FIG. 2. More specifically, the annotated reference image 410 includes reference image data 412 and reference annotation data 414. The reference image data 412 represents an image depicting an object of interest as captured or acquired by an image capture device (such as raw image data). By contrast, the reference annotation data 414 includes one or more annotations associated with the object of interest depicted by the reference image data 412.

The image annotation system 400 includes a mapping calculator 402 and an annotation mapper 404. The mapping calculator 402 is configured to determine a mapping 405 that relates at least a portion of the reference image data 412 with a respective portion of the input image data 422. In some implementations, the input image data 422 may represent an input image such as any of the input images 202 of FIG. 2. Thus, the input image data 422 also depicts the same (or similar) object of interest as the reference image data 412. Aspects of the present disclosure recognize that some objects of interest (such as meters) tend to have substantially flat or planar surfaces. Thus, in some implementations, the mapping 405 may be a homography.

A homography is a 3×3 matrix (H) that maps any point $(x_1,y_1,z_1)$ on a first plane (P1) to a respective point $(x_2,y_2,z_2)$ on a second plane (P2), where:

$$\begin{bmatrix} x_2 \\ y_2 \\ z_2 \end{bmatrix} = H \begin{bmatrix} x_1 \\ y_1 \\ z_1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_1 \\ y_1 \\ z_1 \end{bmatrix}$$

As shown in the equation above, a homography H has 8 degrees of freedom. Thus, at least 4 corresponding points are needed on each of the planes P1 and P2 to calculate a homography H. In some implementations, the mapping calculator 402 may calculate a homography H that relates a first plane (P1) in the reference image with a second plane (P2) in the input image based on a random sample consensus (RANSAC) algorithm. For example, the mapping calculator 402 may randomly sample 4 points in each of the images and calculate a homography H based on the 4 pairs of points. The mapping calculator 402 may further determine a set of inliers that satisfy the homography H and iteratively refine the homography H based on the inliers.

Figure 5:
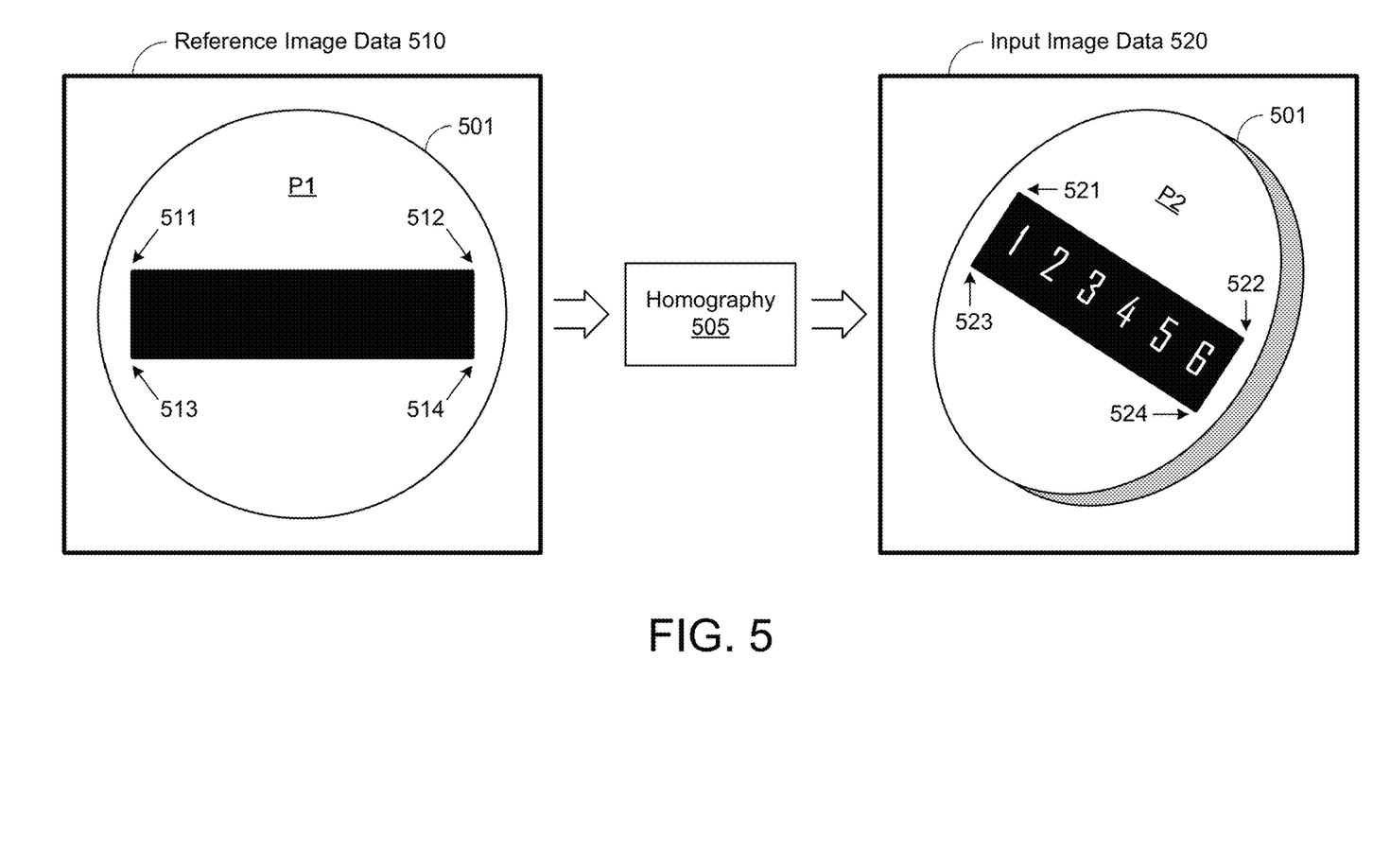
FIG. 5 shows an example mapping of reference image data to input image data based on a homography.

FIG. 5 shows an example mapping of reference image data 510 to input image data 520 based on a homography 505. In some implementations, the homography 505 may be calculated by the mapping calculator 402 of FIG. 4. As such, the reference image data 510, the input image data 520, and the homography 505 may be examples of the reference image data 412, the input image data 422, and the mapping 405, respectively, of FIG. 4.

As shown in FIG. 5, the reference image data 510 depicts an object of interest 501 without any annotations. In some aspects, the object of interest 501 may be any device configured to display a sequence of digital or analog digits (such as the object of interest 301 of FIG. 3). The digits can be displayed within a display region (depicted as a black rectangle) at the center of the object of interest 501. The input image data 520 also depicts the object of interest 501 without any annotations. However, the object of interest 501 is depicted at a different angle by the input image data 520 than by the reference image data 510. Moreover, the input image data 520 depicts the object of interest 501 with a sequence of numbers ("123456") displayed thereon. As shown in FIG. 5, the display region of the object of interest 501 lies on a first plane P1 in a coordinate space associated with the reference image data 510 and also lies on a second plane P2 in a coordinate space associated with the input image data 520.

In some implementations, the homography 505 may relate each image point in the first plane P1 to a respective image point in the second plane P2. As shown in FIG. 5, the corners of the display of the object of interest 501 map to image points 511-514 in the first plane P1 and map to image points 521-524 in the second plane P2. Thus, the homography 505 may transform the image points 511-514 in the first plane P1 to the image points 521-524, respectively, in the second plane P2. Aspects of the present disclosure recognize that the robustness of a homography depends on the number of image points available in each of the planes P1 and P2. Thus, in some implementations, a more robust homography can be calculated by extending the planar surface of the object of interest 501.

Figure 6:
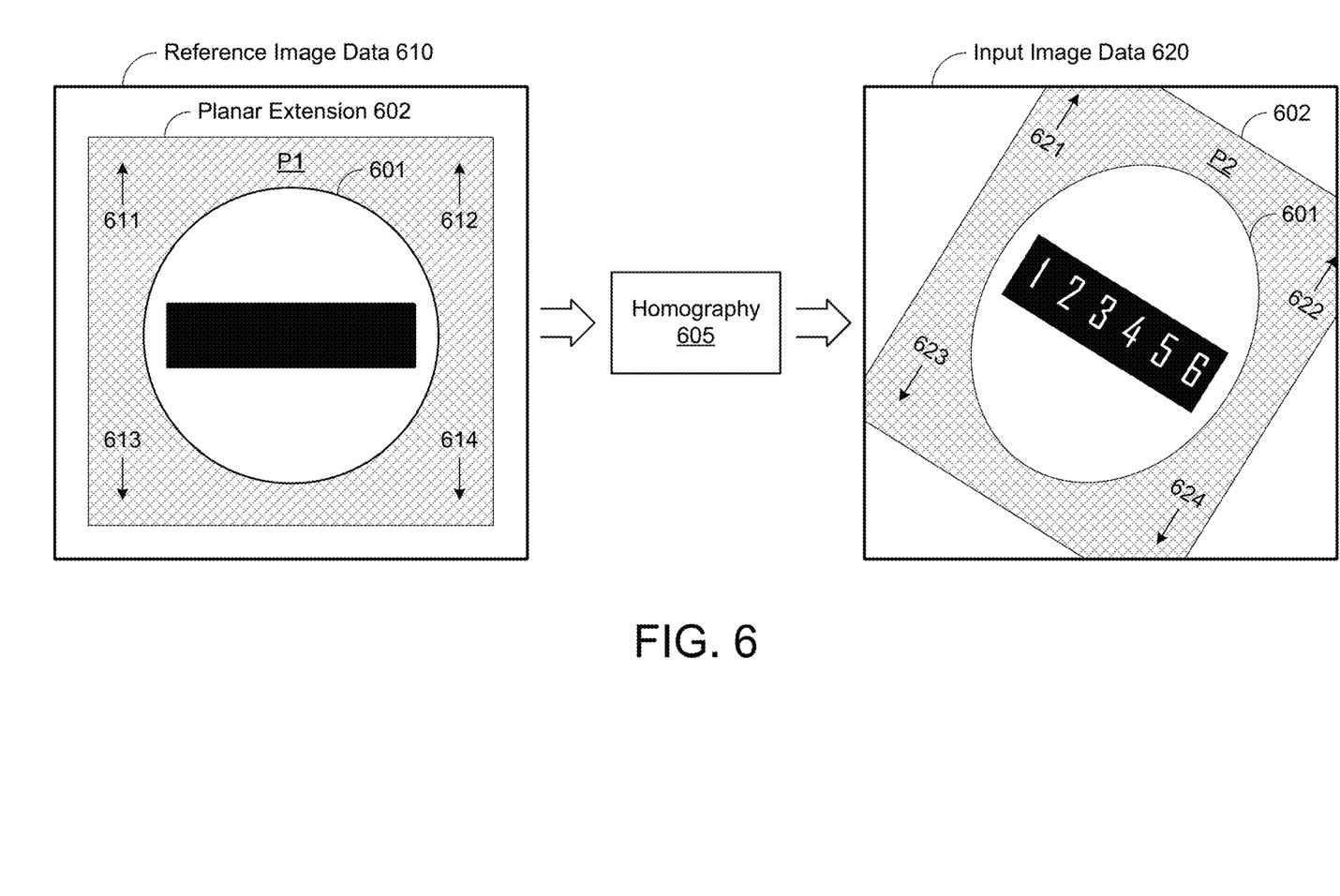
FIG. 6 shows another example mapping of reference image data to input image data based on a homography.

FIG. 6 shows another example mapping of reference image data 610 to input image data 620 based on a homography 605. In some implementations, the homography 605 may be calculated by the mapping calculator 402 of FIG. 4. As such, the reference image data 610, the input image data 620, and the homography 605 may be examples of the reference image data 412, the input image data 422, and the mapping 405, respectively, of FIG. 4.

As shown in FIG. 6, the reference image data 610 depicts an object of interest 601 without any annotations. In some aspects, the object of interest 601 may be any device configured to display a sequence of digital or analog digits (such as the object of interest 301 of FIG. 3). The digits can be displayed within a display region (depicted as a black rectangle) at the center of the object of interest 601. The input image data 620 also depicts the object of interest 601 without any annotations. However, the object of interest 601 is depicted at a different angle by the input image data 620 than by the reference image data 610. Moreover, the input image data 620 depicts the object of interest 601 with a sequence of numbers ("123456") displayed thereon. As shown in FIG. 6, the display region of the object of interest 601 lies on a first plane P1 in a coordinate space associated with the reference image data 610 and also lies on a second plane P2 in a coordinate space associated with the input image data 620.

In some implementations, the homography 605 may relate each image point in the first plane P1 to a respective image point in the second plane P2. However, in contrast with FIG. 5, a planar extension 602 is added or attached to the surface of the object of interest 601 in each of the images 610 and 620 of FIG. 6. For example, the planar extension 602 may be any object having a surface that is coplanar with the surface of the object of interest 601 (such as a sheet of paper, cardboard, or wood, among other examples). Accordingly, the homography 605 may transform a set of image points 611-614 that lies beyond the object of interest 601 in the first plane P1 to respective image points 621-624 that lie beyond the object of interest 601 in the second plane P2. Accordingly, the homography 605 may be more robust than the homography 505 of FIG. 5.

Referring back to FIG. 4, the annotation mapper 404 may map or convert the reference annotation data 414 to input annotation data 424 based on the mapping 405. In some implementations, the annotation mapper 404 may apply the homgraphy H (calculated by the mapping calculator 402) to the reference annotation data 414. As described with reference to FIGS. 5 and 6, the homgraphy H transforms each image point in a first plane P1 associated with the reference image data 412 to a respective image point in a second plane P2 associated with the input image data 422, where the planes P1 and P2 coincide with a surface of the object of interest. Because the annotations are projected onto the surface of the object of interest, the homography H transforms the reference annotation data 414 from the coordinate space of the reference image data 412 to the coordinate space of the input image data 422. As a result, the input image data 422 and the input annotation data 424 may collectively represent an annotated input image 420.

Figure 7:
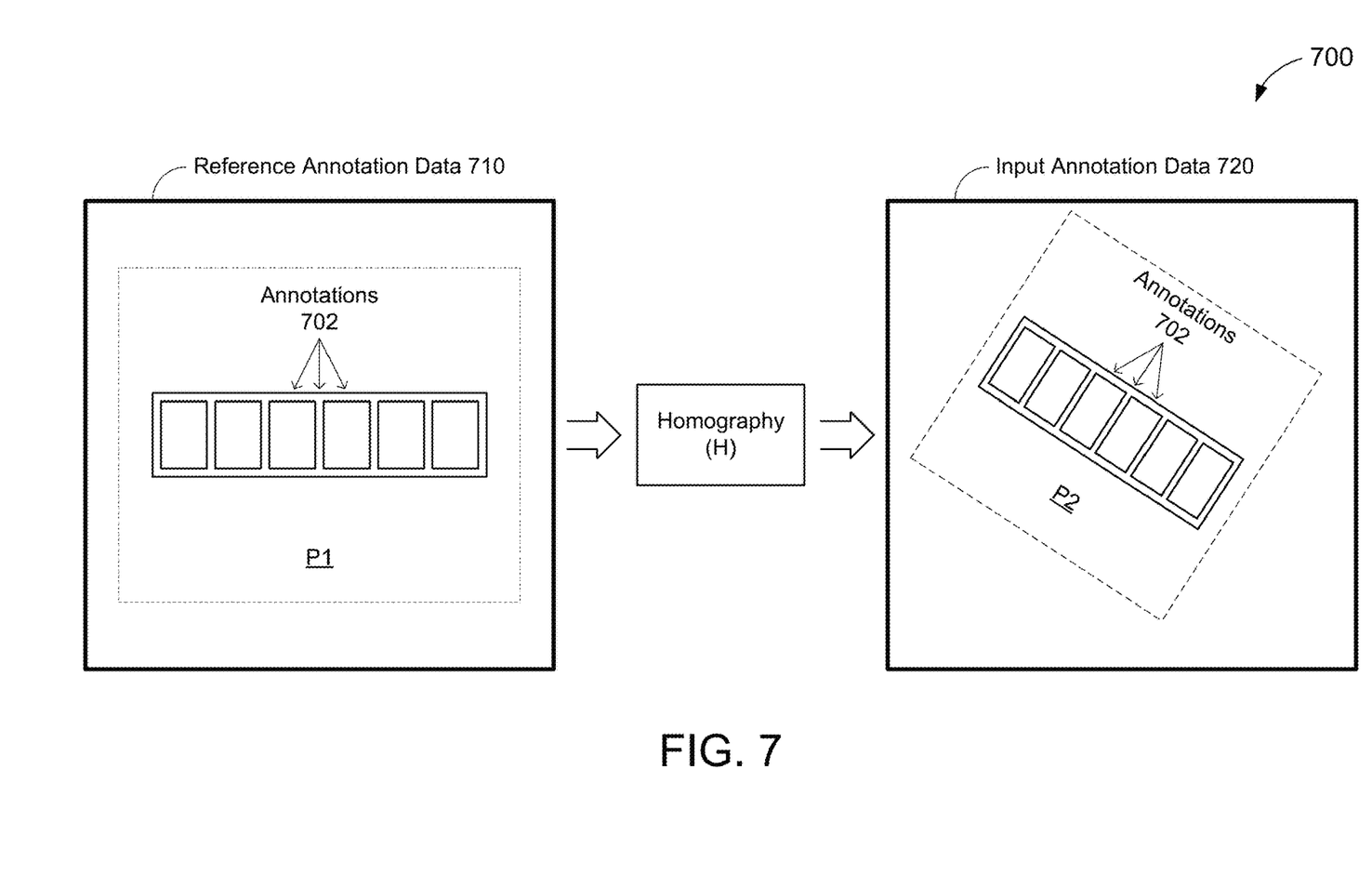
FIG. 7 shows an example mapping of reference annotation data to input annotation data based on a homgraphy.

FIG. 7 shows an example mapping 700 of reference annotation data 710 to input annotation data 720 based on a homography (H). In some implementations, the mapping 700 may be performed by the annotation mapper 404 of FIG. 4. As such, the reference annotation data 710, the input annotation data 720, and the homography H, may be one example of the reference annotation data 414, the input annotation data 424, and the mapping 405, respectively, of FIG. 4. In some implementations, the homography H may be one example of any of the homographies 505 or 605 of FIGS. 5 and 6, respectively.

As shown in FIG. 7, the reference annotation data 710 represents a set of annotations 702 associated with an annotated reference image (such as the annotated reference image 310 of FIG. 3). In the example of FIG. 7, the annotations 702 are shown to include a number of bounding boxes (depicted as six rectangular boxes each coinciding with a respective digit that can be displayed in a display region of an object of interest) and an image mask (depicted as a rectangular box that circumscribes the display region of the object of interest). With reference for example to FIG. 3, the annotations 702 may be one example of the annotations 302. As shown in FIG. 7, the annotations 702 lie on a first plane P1. As described with reference to FIGS. 5 and 6, the first plane P1 is defined by a coordinate space associated with the reference image data 510 or 610, respectively. More specifically, the first plane P1 coincides with a surface of the object of interest 501 or 601 depicted by the reference image data 510 or 610, respectively.

In some implementations, the homography H may transform the annotations 702 from the coordinate space associated with the reference image data 510 or 610 to a coordinate space associated with the input image data 520 or 620 of FIGS. 5 and 6, respectively. More specifically, the homography H transfers the annotations 702 from the first plane P1 to a second plane P2. As described with reference to FIGS. 5 and 6, the second plane P2 coincides with the surface of the object of interest as depicted by the input image data 520 and 620, respectively. Thus, the input annotation data 720 may be combined with the input image data 520 or 620 to produce an annotated input image (such as the annotated input image 330 of FIG. 3B). For example, the annotations 702 may be projected or overlaid upon the input image data 520 or 620 in the annotated input image.

Figure 8:
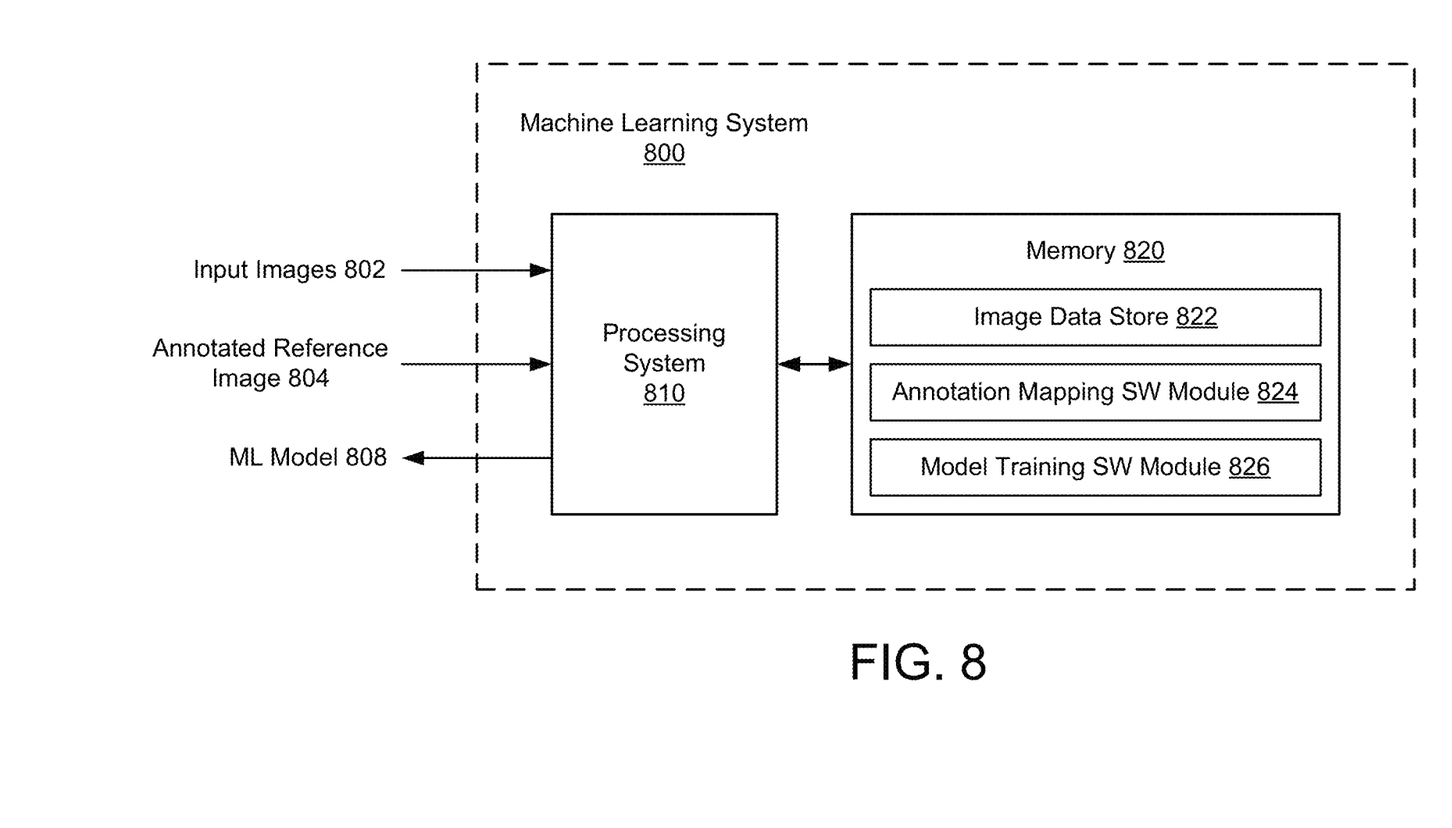
FIG. 8 shows an example machine learning system, according to some implementations.

FIG. 8 shows an example machine learning system 800, according to some implementations. In some implementations, the machine learning system 800 may be one example of the machine learning system 200 of FIG. 2. Thus, the machine learning system 800 may be configured to produce an ML model 808 based, at least in part, on a number of input images 802 and an annotated reference image 804. In some implementations, the input images 802 and the annotated reference image 804 may be examples of the input images 202 and the annotated reference image 201, respectively, of FIG. 2. In some implementations, the machine learning system 800 may include a processing system 810 and a memory 820.

The memory 820 may include an image data store 822 configured to store the input image 802, the annotated reference image 804, and any intermediate images produced by the machine learning system 800 (such as annotated input images). In some implementations, the annotated reference image 804 may depict an object of interest with one or more annotations. By contrast, the input images 802 may depict the same (or similar) object of interest at various distances, angles, locations, or under various lighting conditions, but without the annotations included in the annotated reference image 804.

The memory 820 also may include a non-transitory computer-readable medium (including one or more nonvolatile memory elements, such as EPROM, EEPROM, Flash memory, a hard drive, and the like) that may store at least the following software (SW) modules:

an annotation mapping SW module 824 to map a plurality of first points in the annotated reference image 804 to a respective plurality of second points in an input image 802 so that the one or more annotations in the reference image 804 are projected onto the object of interest in the input image 802; and a model training SW module 826 to train the ML model 808 to produce inferences from images depicting the object of interest based at least in part on the mapping of the plurality of first points to the plurality of second points.

Each software module includes instructions that, when executed by the processing system 810, causes the machine learning system 800 to perform the corresponding functions.

The processing system 810 may include any suitable one or more processors capable of executing scripts or instructions of one or more software programs stored in the machine learning system 800 (such as in memory 820). For example, the processing system 810 may execute annotation mapping SW module 824 to map a plurality of first points in the annotated reference image 804 to a respective plurality of second points in an input image 802 so that the one or more annotations in the reference image 804 are projected onto the object of interest in the input image 802. The processing system 610 may further execute the model training SW module 826 to train the ML model 808 to produce inferences from images depicting the object of interest based at least in part on the mapping of the plurality of first points to the plurality of second points.

Figure 9:
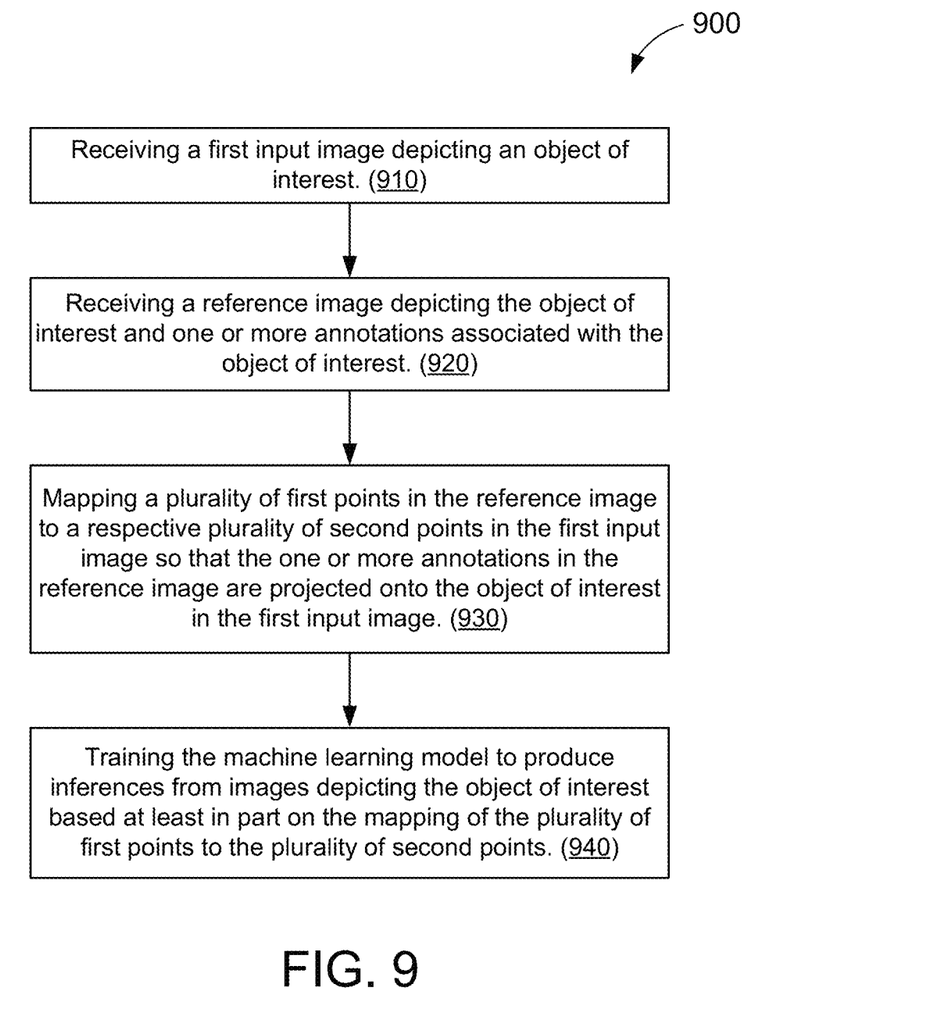
FIG. 9 shows an illustrative flowchart depicting an example operation for training a machine learning model, according to some implementations.

FIG. 9 shows an illustrative flowchart 900 depicting an example operation for training a machine learning model, according to some implementations. In some implementations, the example operation 900 may be performed by a machine learning system (such as the machine learning system 200 of FIG. 2) to train a neural network to infer a value of each digit displayed by an object of interest (such as a meter).

The machine learning system receives a first input image depicting an object of interest (910). In some implementations, the object of interest may be configured to display a sequence of digits. The machine learning system also receives a reference image depicting the object of interest and one or more annotations associated with the object of interest (920). In some implementations, the object of interest may be depicted at a different distance, angle, or location in the reference image than in the first input image. In some implementations, the one or more annotations may include an image mask that delineates the sequence of digits from the remainder of the object of interest. In some implementations, the one or more annotations may include one or more bounding boxes each coinciding with a respective digit in the sequence of digits.

The machine learning system maps a plurality of first points in the reference image to a respective plurality of second points in the first input image so that the one or more annotations in the reference image are projected onto the object of interest in the first input image (930). In some implementations, the mapping of the plurality of first points to the plurality of second points may include calculating a homography that transforms the plurality of first points to the plurality of second points. The machine learning system further trains the machine learning model to produce inferences from images depicting the object of interest based at least in part on the mapping of the plurality of first points to the plurality of second points (940). In some implementations, the training of the machine learning model may include annotating the first input image based on the homography and the one or more annotations in the reference image.

In some implementations, the machine learning system may further receive contextual information indicating a value of each digit in the sequence of digits displayed by the object of interest in the first input image. In such implementations, the training of the machine learning model may be further based on the received contextual information. In some implementations, the inferences include a numerical value associated with the sequence of digits displayed by the object of interest in each of the images.

In some implementations, the machine learning system may further receive a second input image depicting the object of interest and map a plurality of third points in the reference image to a respective plurality of fourth points in the second input image so that the one or more annotations in the reference image are projected onto the object of interest in the second input image. In such implementations, the training of the machine learning model may be further based on the mapping of the plurality of third points to the plurality of fourth points.

In some implementations, the object of interest may be depicted at a different distance, angle, or location in the first input image than in the second input image. In some implementations, the object of interest may be depicted under different lighting conditions in the first input image than in the second input image. In some implementations, the sequence of digits displayed by the object of interest in the first input image may have a different numerical value than the sequence of digits displayed by the object of interest in the second input image.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of training a machine learning model, comprising:
    receiving a first input image depicting an object of interest and a planar extension object attached thereto, the planar extension object having a planar surface that is coplanar with a surface of the object of interest;
    receiving a reference image depicting the object of interest and one or more annotations associated with the object of interest;
    mapping a plurality of first points in the reference image to a respective plurality of second points in the first input image so that the one or more annotations in the reference image are projected onto the object of interest in the first input image, wherein one or more first points of the plurality of first points and one or more second points of the plurality of second points coincide with the planar surface; and
    training the machine learning model to produce inferences from images depicting the object of interest based at least in part on the mapping of the plurality of first points to the plurality of second points.

2. The method of claim 1, wherein the mapping of the plurality of first points to the plurality of second points comprises:
    calculating a homography that transforms the plurality of first points to the plurality of second points.

3. The method of claim 2, wherein the training of the machine learning model comprises:
    annotating the first input image based on the homography and the one or more annotations in the reference image.

4. The method of claim 1, wherein the object of interest is depicted at a different distance, angle, or location in the reference image than in the first input image.

5. The method of claim 1, wherein the object of interest is configured to display a sequence of digits.

6. The method of claim 5, wherein the one or more annotations include an image mask that delineates the sequence of digits from the remainder of the object of interest.

7. The method of claim 5, wherein the one or more annotations include one or more bounding boxes each coinciding with a respective digit in the sequence of digits.

8. The method of claim 5, further comprising:
    receiving contextual information indicating a value of each digit in the sequence of digits displayed by the object of interest in the first input image, the training of the machine learning model being further based on the received contextual information.

9. The method of claim 8, wherein the inferences include a numerical value associated with the sequence of digits displayed by the object of interest in each of the images.

10. The method of claim 5, further comprising:
    receiving a second input image depicting the object of interest; and
    mapping a plurality of third points in the reference image to a respective plurality of fourth points in the second input image so that the one or more annotations in the reference image are projected onto the object of interest in the second input image, the training of the machine learning model being further based on the mapping of the plurality of third points to the plurality of fourth points.

11. The method of claim 10, wherein the object of interest is depicted at a different distance, angle, or location in the first input image than in the second input image.

12. The method of claim 10, wherein the object of interest is depicted under different lighting conditions in the first input image than in the second input image.

13. The method of claim 10, wherein the sequence of digits displayed by the object of interest in the first input image has a different numerical value than the sequence of digits displayed by the object of interest in the second input image.

14. A machine learning system comprising:
a processing system; and
a memory storing instructions that, when executed by the processing system, causes the machine learning system to:
receive a first input image depicting an object of interest and a planar extension object attached thereto, the planar extension object having a planar surface that is coplanar with a surface of the object of interest;
receive a reference image depicting the object of interest and one or more annotations associated with the object of interest;
map a plurality of first points in the reference image to a respective plurality of second points in the first input image so that the one or more annotations in the reference image are projected onto the object of interest in the first input image, wherein one or more first points of the plurality of first points and one or more second points of the plurality of second points coincide with the planar surface; and
train the machine learning model to produce inferences from images depicting the object of interest based at least in part on the mapping of the plurality of first points to the plurality of second points.

15. The machine learning system of claim 14, wherein the mapping of the plurality of first points to the plurality of second points comprises:
calculating a homography that transforms the plurality of first points to the plurality of second points.

16. The machine learning system of claim 15, wherein the training of the machine learning model comprises:
annotating the first input image based on the homography and the one or more annotations in the reference image.

17. The machine learning system of claim 14, wherein the object of interest is configured to display a sequence of digits and the one or more annotations include an image mask that delineates the sequence of digits from the remainder of the object of interest or include one or more bounding boxes each coinciding with a respective digit in the sequence of digits.

18. The machine learning system of claim 17, wherein execution of the instructions further causes the machine learning system to:
receive contextual information indicating a value of each digit in the sequence of digits displayed by the object of interest in the first input image, the training of the machine learning model being further based on the received contextual information.

19. The machine learning system of claim 18, wherein the inferences include a numerical value associated with the sequence of digits displayed by the object of interest in each of the images.

20. The machine learning system of claim 17, wherein execution of the instructions further causes the machine learning system to:
receive a second input image depicting the object of interest, the sequence of digits displayed by the object of interest in the first input image having a different numerical value than the sequence of digits displayed by the object of interest in the second input image; and
map a plurality of third points in the reference image to a respective plurality of fourth points in the second input image so that the one or more annotations in the reference image are projected onto the object of interest in the second input image, the training of the machine learning model being further based on the mapping of the plurality of third points to the plurality of fourth points.

* * * * *